Nov. 28, 1950      A. D. ROBBINS      2,531,744

BALANCED FLUID CLUTCH

Original Filed Nov. 18, 1943

INVENTOR.

Azor D Robbins

Patented Nov. 28, 1950

2,531,744

UNITED STATES PATENT OFFICE 2,531,744

BALANCED FLUID CLUTCH

Azor D. Robbins, Glen Cove, N. Y.

Original application November 18, 1943, Serial No. 510,711. Divided and this application March 15, 1946, Serial No. 654,604

6 Claims. (Cl. 192—85)

The present invention relates to clutches for transmissions of the type used in motor vehicles, it is a division of a copending application for a patent in transmissions Serial No. 510,711, filed November 18, 1943, and embodies more specifically an improved clutch construction by means of which a predetermined desired number of speed changes may be affected in a transmission by consecutively engaging a series of said friction clutches, one for each train of gears.

A primary object of the invention is to provide compact and powerful clutches by means of which various gears may be coupled in driving engagement with the shafts on which said gears and clutches are mounted, or the gears may be released to turn freely on said shafts.

Figure 1:
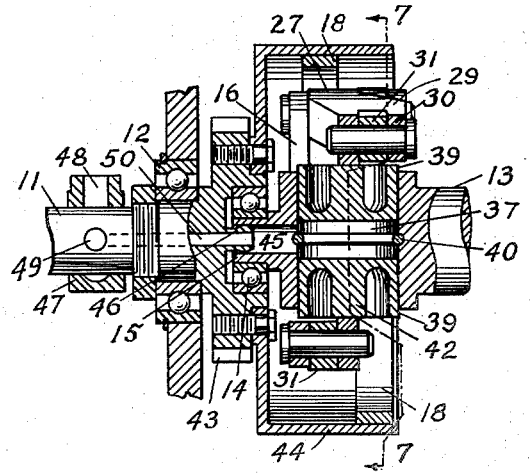
Figure 2:
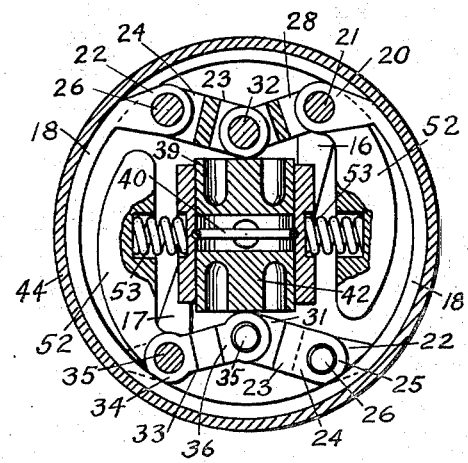
Figure 3:
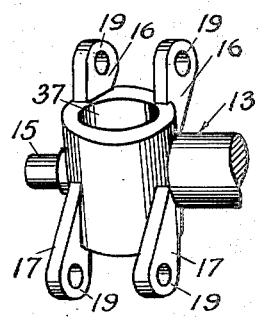
Figure 6:
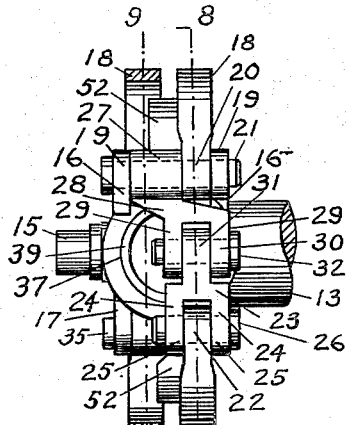
Figure 4:
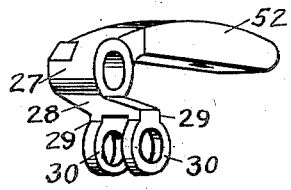
Figure 5:
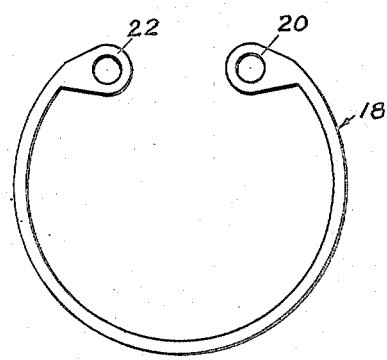

Further objects of the invention will appear hereinafter as it is described in detail and in connection with the accompanying drawing in which Figure 1 is a view showing a section through a clutch constructed in accordance with the present invention. Fig. 2 is a view partly in section through Fig. 1 generally on line 7—7. Fig. 3 shows a portion of the shaft on which the clutch parts are mounted. Fig. 4 shows an operating arm, or bell crank which also has formed on it a counterweight. Fig. 5 shows one of the friction shoes used in the clutch. Fig. 6 shows an assembly of the shaft as in Fig. 3 but carrying the shoes and operating arms or as would be seen in Fig. 2, viewed from above, with the friction drum removed.

Referring to Fig. 1, the shaft 11 is adapted to be rotatively connected to the engine of an automobile and is mounted in an antifriction bearing 12. A second shaft 13 is mounted in axial alignment with shaft 11 and shaft 11 carries an antifriction bearing 14, supporting the shaft 13 by means of extension 15 on shaft 13.

Shaft 13 has two pairs of radial arms one pair of which is indicated by the numerals 16 and the other pair indicated by the numerals 17. These arms form supports for the shoes 18. Said arms 16 and 17 have eyes 19 and said shoes 18 have eyes 20 to receive clevis pins 21 which pass through the eyes 19 and 20 to attach said shoes to said arms. The shoes 18 also have eyes 22 to provide attachment to links 23. The links 23 have forked ends 24 with eyes 25 to receive clevis pins 26 which pass through eyes 22 of the shoes and eyes 25 of said links.

Referring to Fig. 4 which shows a bell crank comprising a hub 27 from which radiates an arm 28 terminating in forked ends 29, this hub is mounted between arms 16 and pivoted on pin 21. The pair of arms 16 are spaced wide enough apart to permit the hub 27 and the eye 20 of one of shoes 18 to be mounted between said arms with the common axis of pin 21. The link 23 has an eye 31 adapted to fit between the forked ends 29 of said arms 28 and said link 23 and said arm are pivotally connected by clevis pin 32.

Referring to Fig. 6 it will be noted that the hub 27 and the eye 20 of one of shoes 18, when mounted in the arms 16, the arm 28 is offset so that space between forked ends 29, an eye 31 of link 23 and the central plane of one of shoes 18, are all in a plane substantially as shown by line 8—8 of Fig. 6.

Another operating arm 33 is carried between the pair of arms 17 and mounted on pin 34. This operating arm is similar to that shown in Fig. 4 and has a hub 35 but the arm 33 is offset in the opposite direction to arm 28. The space between the forks 36 of arm 33, the eye 31 of another of said links 23 and another of shoes 18 are in a plane shown as line 9—9 of Fig. 6. The shoe 18 is pivotally supported by eye 20 on pin 35 and said shoe is connected by eye 22 to another link 23 by a pin 26.

The shaft 13 has a transverse cylindrical bore 37 located between the pairs of arms 16 and 17. Within said bore are pistons 39 positioned in opposed pairs. The pistons are free to move outwardly in said bore but are limited in their inward movement by an annular ring 40 centrally located in said bore. The pistons each have an outwardly projecting boss 42 adapted to abut against one of the forked ends 24 or 36 of the operating arms 28 or 33.

At the end of shaft 11 is a gear 43 which serves as a flange to which is attached a drum 44 adapted to rotate with said shaft. The extension 15 of shaft 13 has a central bore 45 adapted to receive a projection 46 from shaft 11. This projection fits closely within the bore 45. On shaft 11 is carried a non-rotative collar 47 with an opening 48 in the plane of an opening 49 in shaft 11. Opening 49 communicates with a passage 50, centrally positioned in shaft 11. This passage extends through projection 46 and communicates with bore 45 in shaft 13 eventually leading to cylindrical bore 37. The opening 48 of collar 47 is adapted to receive a fitting, not shown, through which fluid, preferably oil, may be forced.

It will now be seen that if fluid, under pressure, is forced into the cylindrical bore 37, the pistons 39 will be force outward against the forked ends of arms 28 and 33 thereby forcing both arms and the links 23, outward thereby causing a toggle action between said links and said arms. This toggle action will move the eye 22 of shoe 18 in a tangential direction thereby expanding said shoes in a manner which will cause them to frictionally engage the drum 44.

The construction of the shoe as shown in Fig. 5, discloses it to be an integral piece, preferably of elastic material, with an outside radius a little less than the inside radius of drum 44. The shoe may have a relatively thin section in the radial direction, therefore, a relatively small amount of force applied to separate the eyes 20 and 22, will expand the shoe sufficient to make contact with the drum.

From each of hubs 27 or 34 there extends a counterweight 52 which is positioned so that, when shaft 13 is rotated, centrifugal force, which tends to move said counterweight away from the center of the shaft, will move arms 28 or 33 inward and through links 23 draw eyes 22 tangentially toward eyes 20 of shoes 18 and movement in this direction will contract the diameter of said shoes. If no counterweight were provided, rotation of shaft 13 would, by centrifugal force, expand shoes 18 and at high speeds would interfere with disengaging said shoes from frictional engagement with said drum. By using a suitable size of counterweight the centrifugal forces of both weight and shoe may be balanced and the forces required to release said shoes from frictional engagement will not be affected by the speed of rotation.

In order to release the shoes 18 from frictional engagement with the drum 44, springs 53 are interposed between shaft 13 and counterweights 52. When hydrostatic pressure is removed from pistons 39, said springs move said counterweights outward and, operating through arms 28 and 33, contract said shoes and also force the pistons 39 to their inward position.

It will be seen from the foregoing that the elements described comprise a clutch which, through hydrostatic pressure can be made to provide powerful frictional engagement between the shoes 18 and the drum 44, thereby frictionally locking shafts 11 and 13 in driving engagement.

It should be pointed out that this forms a compact clutch with the operating forces well balanced, placing two pistons in the single bore 37 makes possible the balancing of the outward thrust of one piston and links against the outward thrust of the other piston and links.

While I have shown the preferred form of my invention it is to be considered in an illustrative and not in a limiting sense, and many changes may be made without departing from the spirit of the invention as set forth in the following claims.

I claim:

1. A friction clutch comprising a shaft, a friction drum in axial alignment with said shaft, said shaft having a radial bore within said drum, a pair of transverse arms carried by said shaft and having eyes at their outer ends, a flexible arcuate shoe having eyes at each end of its arc length, a pin mounted through the eyes of said arms and one of the eyes of said shoe, an angularly movable arm pivotally mounted on said pin, a link pivotally connecting said arm to the other eye of said shoe, a piston within said radial bore adapted to move said movable arm outwardly, said movable arm and said link being positioned to expand said shoe when said arm is moved outward and said shaft having a passage to admit fluid under hydrostatic pressure to said radial bore.

2. A friction clutch comprising a shaft, a friction drum in axial alignment with said shaft, said shaft having a radial bore within said drum, a pair of transverse arms carried by said shaft and having eyes at their outer ends, a flexible arcuate shoe within said drum having eyes at each end of its arc length, a pin mounted through the eyes of said arms and one of the eyes of said shoe, an angularly movable arm pivotally mounted on said pin, a link pivotally connecting said movable arm to the other eye of said shoe, a piston within said radial bore adapted to move said movable arm outwardly, said movable arm and said link being positioned to expand said shoe when said arm is moved outward, said shaft having a passage to admit fluid under hydrostatic pressure to said radial bore, said movable arm having a counterweight rigidly fixed thereto and positioned to counterbalance centrifugal force tending to expand said shoe.

3. A friction clutch comprising a shaft, a friction drum in axial alignment with said shaft, said shaft having a radial bore within said drum, a pair of transverse arms carried by said shaft, a flexible arcuate shoe pivotally mounted at one end between said transverse arms, an angularly movable arm having one end pivotally mounted between said transverse arms and having its movable end operatively connected to the other end of said shoe, a piston within said radial bore adapted to move said angularly movable arm and said shaft having a passage to admit fluid under hydrostatic pressure to said radial bore.

4. A friction clutch comprising a shaft, a friction drum in axial alignment with said shaft, said shaft having a transverse bore within said drum, a pair of transverse arms carried by said shaft, a flexible arcuate shoe pivotally mounted at one of its ends between said transverse arms, an angularly movable arm pivotally mounted between said transverse arms, a link connecting said movable arm to the other end of said shoe, a second pair of transverse arms carried by said shaft and opposite the first named transverse arms, a second flexible arcuate shoe pivotally mounted at one of its ends between said second pair of transverse arms, a second link connecting said second movable arm to the other end of said second shoe, said movable arms and said links being positioned to expand said shoes when said arms are moved outward, a pair of pistons in said transverse bore and adapted to force said movable arms outward and said shaft having a passage to admit fluid under hydrostatic pressure between said pistons.

5. A friction clutch comprising a shaft, a friction drum in axial alignment with said shaft, said shaft having a transverse bore, a pair of transverse arms extending from said shaft, a flexible arcuate shoe pivotally mounted at one of its ends between said transverse arms, an angularly movable arm pivotally mounted in said transverse arms, a link connecting said movable arm to the other end of said shoe, a second pair of transverse arms carried by said shaft and opposite the first named transverse arms, a second flexible arcuate shoe pivotally mounted at one of its ends between said second pair of transverse arms, a second angularly movable arm pivotally mounted in said second pair of transverse arms, a second link connecting said second movable arm to the other end of said second shoe, a pair of plungers in said transverse bore and means adapted to force said plungers outward against said movable arms.

6. A friction clutch comprising a shaft, a friction drum, in axial alignment with said shaft, said shaft having a transverse bore within said drum, a pair of transverse arms carried by said shaft and having eyes at their outer ends, a flexible arcuate shoe having eyes at each end of its arc length, a pin mounted through the eyes of said transverse arms and one of the eyes of said shoe, an angularly movable arm pivotally mounted on said pin, a link pivotally connecting said movable arm to the other end of shoe, a second pair of transverse arms carried by said shaft and having eyes at their outer ends a second flexible arcuate shoe having eyes at each of its arc length, a second pin mounted through the eyes of said second pair of transverse arms and one of the eyes of said second shoe, a second angularly movable arm pivotally mounted on said second pin, a second link pivotally connecting said second shoe, pistons within said transverse bore and adapted to move said movable arms, and said movable arms axially offset from their pivoted supports to their point of contact with said pistons.

AZOR D. ROBBINS.

REFERENCES CITED

The following references are of record in the file of this patent:

UNITED STATES PATENTS

| Number | Name | Date |
| --- | --- | --- |
| 504,110 | McConnell | Aug. 29, 1893 |
| 635,684 | Herschmann | Oct. 24, 1899 |
| 804,263 | Peteler | Nov. 14, 1905 |
| 1,847,389 | Fawick | Mar. 1, 1932 |
| 1,858,004 | Eason | May 10, 1932 |
| 2,197,807 | Magee | Apr. 23, 1940 |
| 2,213,383 | Canfield | Sept. 3, 1940 |
| 2,251,862 | Wilson | Aug. 5, 1941 |
| 2,265,694 | Lane et al. | Dec. 9, 1941 |